(12) United States Patent
Miyazato et al.

(10) Patent No.: US 12,412,401 B2
(45) Date of Patent: Sep. 9, 2025

(54) TRAFFIC SIGN RECOGNITION DEVICE AND TRAFFIC SIGN RECOGNITION METHOD

(71) Applicants: TOYOTA JIDOSHA KABUSHIKI KAISHA, Aichi-ken (JP); DENSO CORPORATION, Aichi-pref (JP)

(72) Inventors: Kazuhiro Miyazato, Susono (JP); Toshiya Koyasu, Tokyo (JP)

(73) Assignees: TOYOTA JIDOSHA KABUSHIKI KAISHA, Aichi-ken (JP); DENSO CORPORATION, Aichi-pref (JP)

( * ) Notice: Subject to any disclaimer, the term of this patent is extended or adjusted under 35 U.S.C. 154(b) by 370 days.

(21) Appl. No.: 18/157,843

(22) Filed: Jan. 23, 2023

(65) Prior Publication Data

US 2023/0237812 A1    Jul. 27, 2023

(30) Foreign Application Priority Data

Jan. 25, 2022  (JP) ................. 2022-009668

(51) Int. Cl.
  *G06T 7/70* (2017.01)
  *G06V 20/58* (2022.01)

(52) U.S. Cl.
  CPC .............. *G06V 20/582* (2022.01); *G06T 7/70* (2017.01); *G06T 2207/10028* (2013.01)

(58) Field of Classification Search
  CPC ...... G06V 20/582; G06V 10/25; G06V 10/56; G06T 7/70; G06T 2207/10028; G06T 7/74; G06T 7/90; G06T 2207/10016; G06T 2207/10024; G06T 2207/20084; G06T 2207/30252; G06T 7/60

USPC ............................................ 382/103
  See application file for complete search history.

(56) References Cited

U.S. PATENT DOCUMENTS

| 2004/0086153 A1* | 5/2004 | Tsai ..................... G06V 20/582 |
| | | 382/104 |
| 2016/0054138 A1* | 2/2016 | Kojo ...................... G06T 7/60 |
| | | 701/423 |
| 2016/0117562 A1* | 4/2016 | Chung ................... G06F 18/22 |
| | | 382/104 |

FOREIGN PATENT DOCUMENTS

| JP | 2008-234102 A | 10/2008 |
| JP | 2009037375 A | 2/2009 |
| JP | 2009-076096 A | 4/2009 |
| JP | 2018195117 A | 12/2018 |

\* cited by examiner

*Primary Examiner* — Stephen P Coleman
(74) *Attorney, Agent, or Firm* — HAUPTMAN HAM, LLP (57) ABSTRACT

A traffic sign recognition device includes a storage device configured to store a camera image from a movable body and pieces of three-dimensional point group data, and a processor. The processor is configured to: estimate a relative position of the traffic sign candidate to the movable body; specify a set of three-dimensional point group data; and specify an image region of an object corresponding to a set region indicative of a region where the set is specified, the object including the traffic sign candidate. The processor is configured to calculate a percentage of a predetermined color component constituting a guide sign among color components constituting an image of the object. In a case where the percentage of the predetermined color component is equal to or more than a threshold, the processor recognizes the object including the traffic sign candidate to be the guide sign.

6 Claims, 11 Drawing Sheets

< BEFORE ACQUISITION OF FIRST SET OF
THREE-DIMENSIONAL POINT GROUP DATA >

● POINT GROUP

FIG. 8B

< AFTER ACQUISITION OF FIRST SET OF
THREE-DIMENSIONAL POINT GROUP DATA >

● POINT GROUP

FIG. 9

FIG. 10A
< FIRST SET >

FIG. 10B
< SECOND SET >

FIG. 10C
< SET REGION >
SET REGION

● POINT GROUP

FIG. 11

TRAFFIC SIGN RECOGNITION DEVICE AND TRAFFIC SIGN RECOGNITION METHOD

CROSS-REFERENCE TO RELATED APPLICATION

This application claims priority to Japanese Patent Application No. 2022-009668 filed on Jan. 25, 2022, incorporated herein by reference in its entirety.

BACKGROUND

1. Technical Field

This disclosure relates to a traffic sign recognition device and a traffic sign recognition method each for recognizing a traffic sign.

2. Description of Related Art

Japanese Unexamined Patent Application Publication No. 2018-195117 (JP 2018-195117 A) describes a drive recorder that can alert a driver of a vehicle to prevent a reverse run. In this technology, it is determined whether or not the advancing direction of the vehicle is a reverse direction to a direction where the vehicle should travel. In a case where it is determined that the advancing direction is the reverse direction, a warning is given to a driver.

SUMMARY

However, as a traffic sign, there is a traffic sign displayed on a road sign or a traffic sign displayed on a guide sign. Further, the traffic sign includes a traffic regulation sign (a no-vehicle entry sign, a stop sign, or the like), a traffic indication sign (a direction instruction or the like), and so on. In a case where the traffic sign is a traffic regulation sign indicative of no-vehicle entry, displayed on a "road sign," and the traffic sign is determined to be the traffic regulation sign by recognition of a traffic sign candidate detected by a camera, it may be said that the traffic sign candidate is recognized correctly.

However, in a case where the traffic sign is a traffic regulation sign indicative of no-vehicle entry, displayed on a "guide sign," and the traffic sign is determined to be the traffic regulation sign by recognition of a traffic sign candidate detected by a camera, it may be not necessarily said that the recognition of the traffic sign candidate is correct.

This disclosure provides the technology that can improve the accuracy of recognition of a traffic sign candidate detected by a camera.

A traffic sign recognition device according to a first aspect of this disclosure includes: a storage device configured to store a camera image captured from a movable body and pieces of three-dimensional point group data; and a processor. The processor is configured to, in a case where the camera image includes an image of a traffic sign candidate, estimate a relative position of the traffic sign candidate to the movable body based on the camera image. The processor is configured to specify a set of pieces of three-dimensional point group data including a relative position to the movable body among the pieces of three-dimensional point group data. The relative position of the specified set of pieces of three-dimensional point group data is equal to the relative position of the traffic sign candidate. The processor is configured to specify, in the camera image, an image region of an object including the traffic sign candidate. The image region of the object corresponds to a set region indicative of a region where the set is specified. The processor is configured to calculate, based on a size of the image region of the object and color components constituting the image of the object, a percentage of a predetermined color component constituting a guide sign among the color components constituting the image of the object. The processor is configured to, in a case where the percentage of the predetermined color component is equal to or more than a threshold, recognize the object including the traffic sign candidate to be the guide sign.

In the traffic sign recognition device according to the first aspect of this disclosure, the storage device may be configured to store: information on the resolution of a camera; information on specifications of the camera, including information on a mounting height of the camera; and information on a specified size of the traffic sign candidate. The relative position may include a relative distance of the traffic sign candidate to the movable body, and a height of the traffic sign candidate. The height of the traffic sign candidate may be obtained by adding the mounting height of the camera to a relative height of the traffic sign candidate to the movable body. Information on the camera image may include information on a plurality of camera images acquired by a plurality of cameras. The processor may be configured to estimate the relative distance by performing calculation by use of the resolution of the camera, the number of pixels constituting the image of the traffic sign candidate in a lateral direction, and the specified size. The processor may estimate the relative height by performing calculation by use of the relative distance, the resolution of the camera, and the number of pixels constituting the image of the traffic sign candidate in a vertical direction.

In the traffic sign recognition device according to the first aspect of this disclosure, the storage device may be configured to store: information on the resolution of a camera; and information on specifications of the camera including information on the mounting height of the camera. The relative position may include a relative distance of the traffic sign candidate to the movable body, and a height of the traffic sign candidate. The height of the traffic sign candidate may be obtained by adding the mounting height of the camera to a relative height of the traffic sign candidate to the movable body. The camera image may include a plurality of camera images acquired by a plurality of cameras. The cameras may be placed at different positions. The processor may be configured to, in a case where the camera images include the image of the traffic sign candidate, estimate the relative distance based on principle of triangulation from the image of the traffic sign candidate. The processor may estimate the relative height by performing calculation by use of the relative distance, the resolution of the camera, and the number of pixels constituting the image of the traffic sign candidate in a vertical direction.

In the traffic sign recognition device according to the first aspect of this disclosure, a lateral width and a vertical width of the set region may be calculated based on a set satisfying a predetermined condition in the specified set, and at least the lateral width may be equal to or more than a predetermined magnitude.

In the traffic sign recognition device according to the first aspect of this disclosure, the predetermined condition may include a condition that the distance between pieces of three-dimensional point group data included in the set is less than a predetermined distance and a point group density is equal to or more than a predetermined density, the point group density being indicative of how closely the pieces of three-dimensional point group data included in the set gather.

In the traffic sign recognition device according to the first aspect of this disclosure, the color components constituting the image of the object may be indicated by an integrated value obtained by integrating pixel values of red-based pixels, an integrated value obtained by integrating pixel values of green-based pixels, and an integrated value obtained by integrating pixel values of blue-based pixels. The predetermined color component may be at least either one of the integrated value obtained by integrating the pixel values of the green-based pixels and the integrated value obtained by integrating the pixel values of the blue-based pixels.

In the traffic sign recognition device according to the first aspect of this disclosure, the traffic sign candidate may include at least a traffic regulation sign candidate.

A traffic sign recognition method according to a second aspect of this disclosure includes: acquiring a camera image captured from a movable body and pieces of three-dimensional point group data; estimating a relative position of a traffic sign candidate to the movable body based on the camera image in a case where the camera image includes an image of the traffic sign candidate; and specifying a set of pieces of three-dimensional point group data including a relative position to the movable body among the pieces of three-dimensional point group data. The relative position of the specified set of pieces of three-dimensional point group data is equal to the relative position of the traffic sign candidate. The traffic sign recognition method includes specifying, in the camera image, an image region of an object including the traffic sign candidate. The image region of the object corresponds to a set region indicative of a region where the set is specified. The traffic sign recognition method includes: calculating, based on a size of the image region of the object and color components constituting the image of the object, a percentage of a predetermined color component constituting a guide sign among the color components constituting the image of the object; and in a case where the percentage of the predetermined color component is equal to or more than a threshold, recognizing the object including the traffic sign candidate to be the guide sign.

With the first aspect of this disclosure, it is possible to improve the accuracy of recognition of a traffic sign candidate detected by a camera.

With the first aspect of this disclosure, it is possible to estimate the relative position of the traffic sign candidate to the movable body.

With the first aspect of this disclosure, it is possible to estimate the relative position of the traffic sign candidate to the movable body without using the information on the specified size of the traffic sign candidate.

With the first aspect of this disclosure, it is possible to improve the accuracy of specifying a set region.

With the first aspect of this disclosure, it is possible to further improve the accuracy of specifying a set region.

With the first aspect of this disclosure, it is possible to recognize whether or not the object including the traffic sign candidate is the guide sign.

With the first aspect of this disclosure, this disclosure is also applicable to a case where the traffic sign candidate is a traffic regulation sign candidate.

With the second aspect of this disclosure, it is possible to obtain the effect same as the first aspect of this disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

With reference to the drawings, a traffic sign recognition device and a traffic sign recognition method according to an embodiment of this disclosure will be described. Note that the traffic sign recognition method according to the embodiment is implemented by computer processing by the traffic sign recognition device according to the embodiment.

Embodiment

1. Outline

Figure 1:
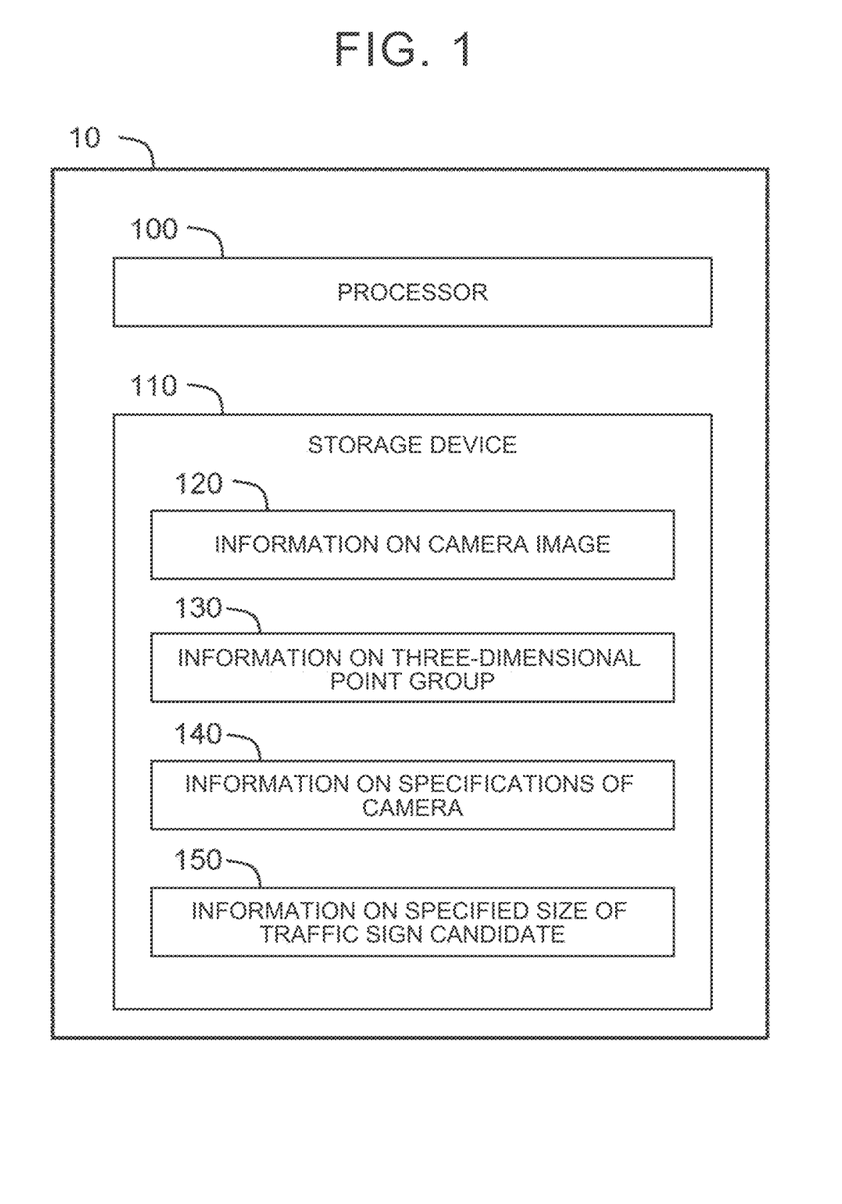
FIG. 1 is a block diagram illustrating an exemplary configuration of a traffic sign recognition device according to an embodiment.

The traffic sign recognition device according to the present embodiment is provided in a movable body. The traffic sign recognition device performs recognition of a traffic sign candidate. FIG. 1 illustrates an exemplary configuration of a traffic sign recognition device 10 according to the present embodiment. The traffic sign recognition device 10 performs various information processes. The traffic sign recognition device 10 includes one or more processors 100 (hereinafter just referred to as the processor 100) and one or more storage devices 110 (hereinafter just referred to as the storage device 110). The processor 100 executes various processes. The processor 100 is, for example, a CPU, an ECU, or the like. In the storage device 110, data of information 120 on a camera image (hereinafter referred to as camera image information 120), data of information 130 on three-dimensional point groups (hereinafter referred to as three-dimensional point group information 130), data of information 140 on specifications of a camera (hereinafter referred to as camera specification information 140), and data of information 150 on a specified size of a traffic sign candidate (hereinafter referred to as traffic-sign-candidate specified size information 150). The storage device 110 is, for example, a volatile memory, a nonvolatile memory, an HDD, an SSD, or the like. The function of an information processing device (the traffic sign recognition device 10) is implemented by the processor 100 executing a traffic sign recognition program as a computer program. The traffic sign recognition program is stored in the storage device 110. The traffic sign recognition program may be stored in a computer-readable recording medium. The traffic sign recognition program may be provided via a network.

The camera image information 120 includes information on an image obtained by capturing an image of a traffic sign candidate by a camera provided in the movable body. The three-dimensional point group information 130 includes information on a point group indicative of three-dimensional coordinates (a coordinate in a lateral direction, a coordinate in a vertical direction, and a coordinate in a depth direction) to be generated by use of a three-dimensional measurement sensor provided in the movable body. The three-dimensional coordinates are generated based on data of reflection light of laser pulses reflected around the movable body. The three-dimensional measurement sensor is, for example, a laser imaging detection and ranging (LIDAR) sensor or the like. The data of the camera specification information 140 includes information on a resolution indicative of an instantaneous field of view per unit pixel in a camera image and information on the mounting height of the camera. The data of the traffic-sign-candidate specified size information 150 includes information on the specified size of a traffic sign candidate displayed on a guide sign.

The traffic sign candidate included in the camera image information 120 may be a traffic sign candidate displayed on a road sign, a traffic sign candidate displayed on a guide sign, or the like. Types of the traffic sign candidate include a traffic regulation sign (a no-vehicle entry sign, a stop sign, or the like), a traffic indication sign (a direction instruction or the like), and so on.

In the traffic sign recognition device 10 according to the present embodiment, the processor 100 executes the traffic sign recognition program. Hereby, the traffic sign recognition device 10 performs various processes to recognize whether a traffic sign candidate detected based on the camera image information 120 is a guide sign or not. More specifically, the traffic sign candidate displayed on the guide sign and the traffic sign candidate displayed on the road sign have different features. By performing the various processes by use of the difference in feature, it can be expected that the accuracy of recognition of the traffic sign candidate is improved. The difference in feature is, for example: that the traffic sign candidate displayed on the guide sign and the traffic sign candidate displayed on the road sign have different heights (the guide sign is provided at a position higher than the road sign); that a region of an object including the traffic sign candidate displayed on the guide sign is different from that on the road sign (the guide sign is a region constituted by a plurality of objects including an object as the traffic sign candidate and other objects, whereas the road sign is a region constituted by a single object including only the object as the traffic sign candidate); and that the percentage of color components of the region of the object on the guide sign is different from that on the road sign (color components constituted by the other objects having a region larger than that of the object as the traffic sign candidate account for a large percentage of the color component of the guide sign, whereas color components constituted by the object as the traffic sign candidate account for a large percentage of the color component of the road sign).

The following describes further details of the traffic sign recognition device 10 according to the present embodiment.

2. Details of Information Processing

The traffic sign recognition device 10 recognizes, based on the camera image information 120, the three-dimensional point group information 130, the camera specification information 140, and the traffic-sign-candidate specified size information 150, whether an object including a traffic sign candidate is a guide sign or not. The traffic sign recognition device 10 according to the present embodiment includes the following characteristic processes.

Figure 2:
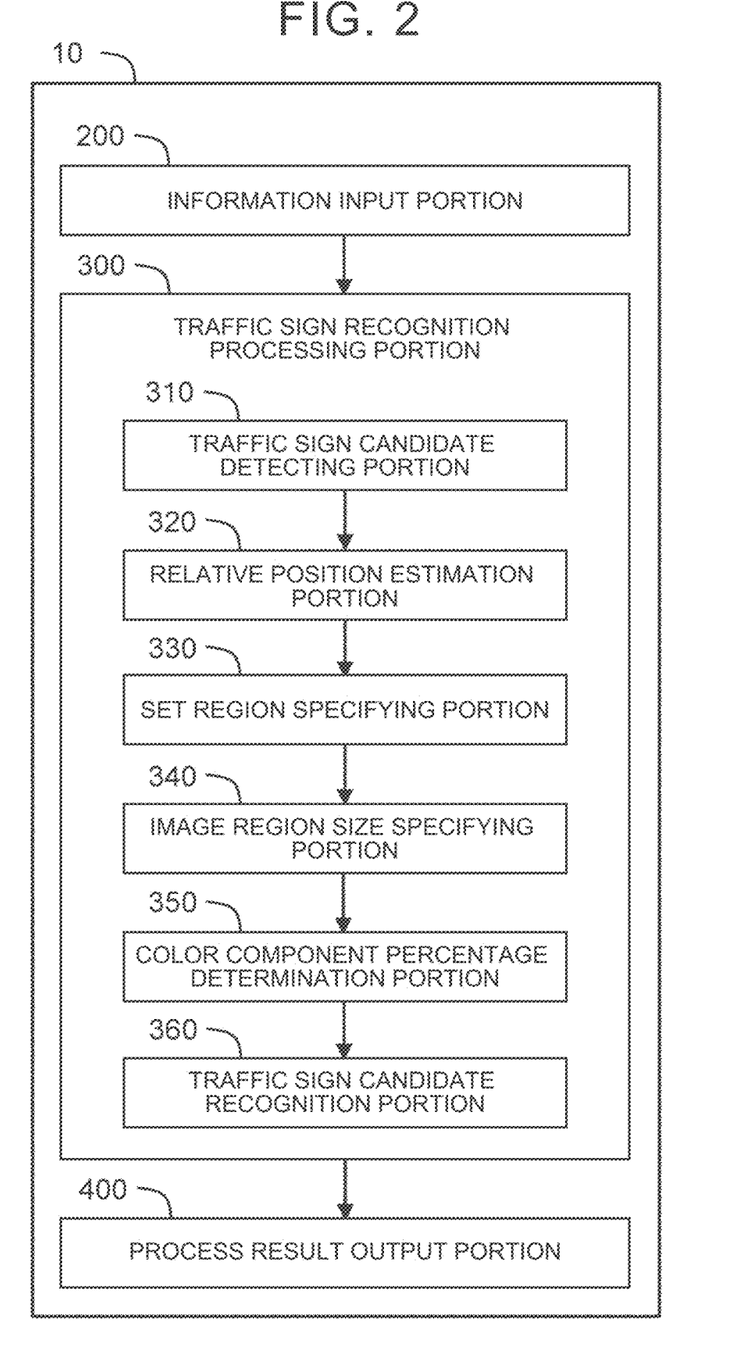
FIG. 2 is a block diagram illustrating an exemplary function of the traffic sign recognition device according to the embodiment.

FIG. 2 is a block diagram illustrating an exemplary function of the traffic sign recognition device 10 according to the present embodiment. The traffic sign recognition device 10 includes an information input portion 200, a traffic sign recognition processing portion 300, and a process result output portion 400 as functional blocks. These functional blocks are implemented by the processor 100 executing the traffic sign recognition program.

The information input portion 200 performs a process of inputting the camera image information 120, the three-dimensional point group information 130, the camera specification information 140, and the traffic-sign-candidate specified size information 150 that have been recorded in the storage device 110. After that, the information input portion 200 outputs, to the traffic sign recognition processing portion 300, the camera image information 120, the three-dimensional point group information 130, the camera specification information 140, and the traffic-sign-candidate specified size information 150 that have been input.

The traffic sign recognition processing portion 300 further includes a traffic sign candidate detecting portion 310, a relative position estimation portion 320, a set region specifying portion 330, an image region size specifying portion 340, a color component percentage determination portion 350, and a traffic sign candidate recognition portion 360. The traffic sign recognition processing portion 300 recognizes whether or not an object including a traffic sign candidate is a guide sign, based on the camera image information 120, the three-dimensional point group information 130, the camera specification information 140, and the traffic-sign-candidate specified size information 150 that have been input in the traffic sign recognition processing portion 300. Details of respective processes of the traffic sign candidate detecting portion 310, the relative position estimation portion 320, the set region specifying portion 330, the image region size specifying portion 340, the color component percentage determination portion 350, and the traffic sign candidate recognition portion 360 will be described later.

Figure 3:
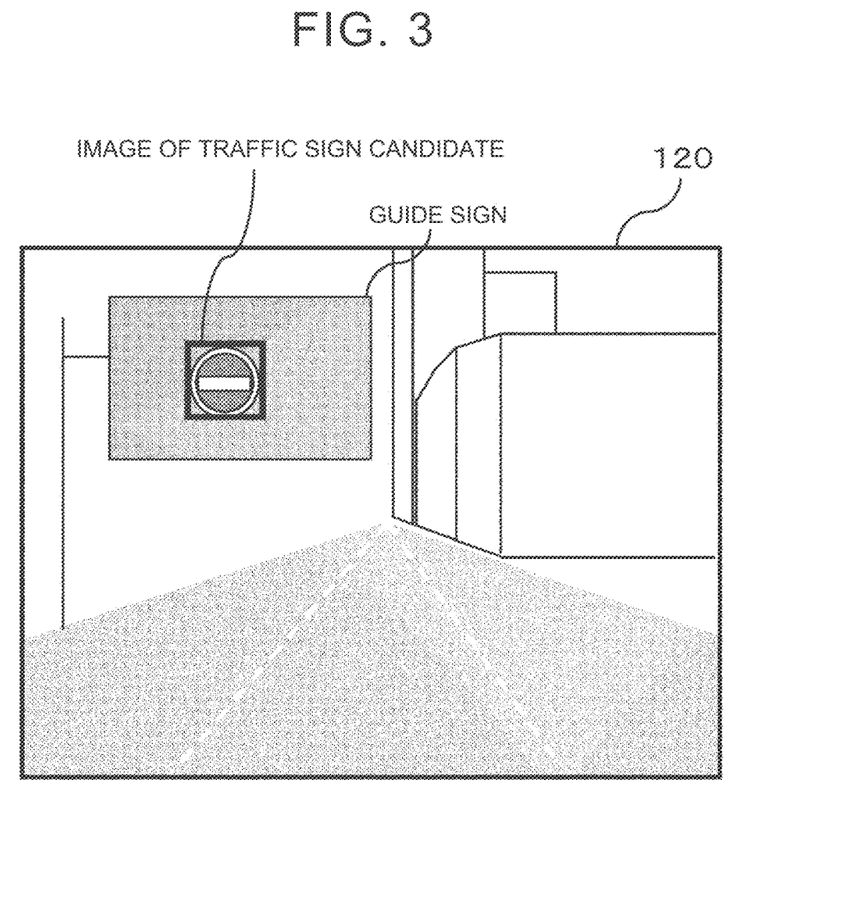
FIG. 3 is a view illustrating an exemplary process result of a traffic sign recognition processing portion in the traffic sign recognition device.

The traffic sign candidate detecting portion 310 performs a process of detecting a traffic sign candidate from a camera image, based on the camera image information 120 that is input. In this process, whether the traffic sign candidate thus detected is a traffic regulation sign, a traffic indication sign, or the like is determined. An exemplary process result when the traffic sign candidate is detected is exhibited like FIG. 3. FIG. 3 illustrates an example in a case where the traffic sign candidate thus detected is a traffic regulation sign candidate indicative of no-vehicle entry. A technique to detect a traffic sign is, for example, template matching, Deep Learning, or the like.

The relative position estimation portion 320 estimates a relative position of the traffic sign candidate to the movable body based on the traffic sign candidate obtained as the process result of the traffic sign candidate detecting portion 310, and the input camera specification information 140 and the input traffic-sign-candidate specified size information 150. The relative position of the traffic sign candidate includes information on a relative distance of the traffic sign candidate to the movable body, and information on the height of the traffic sign candidate, the height being obtained by adding the mounting height of the camera, included in the camera specification information 140, to a relative height of the traffic sign candidate to the movable body.

Figure 4:
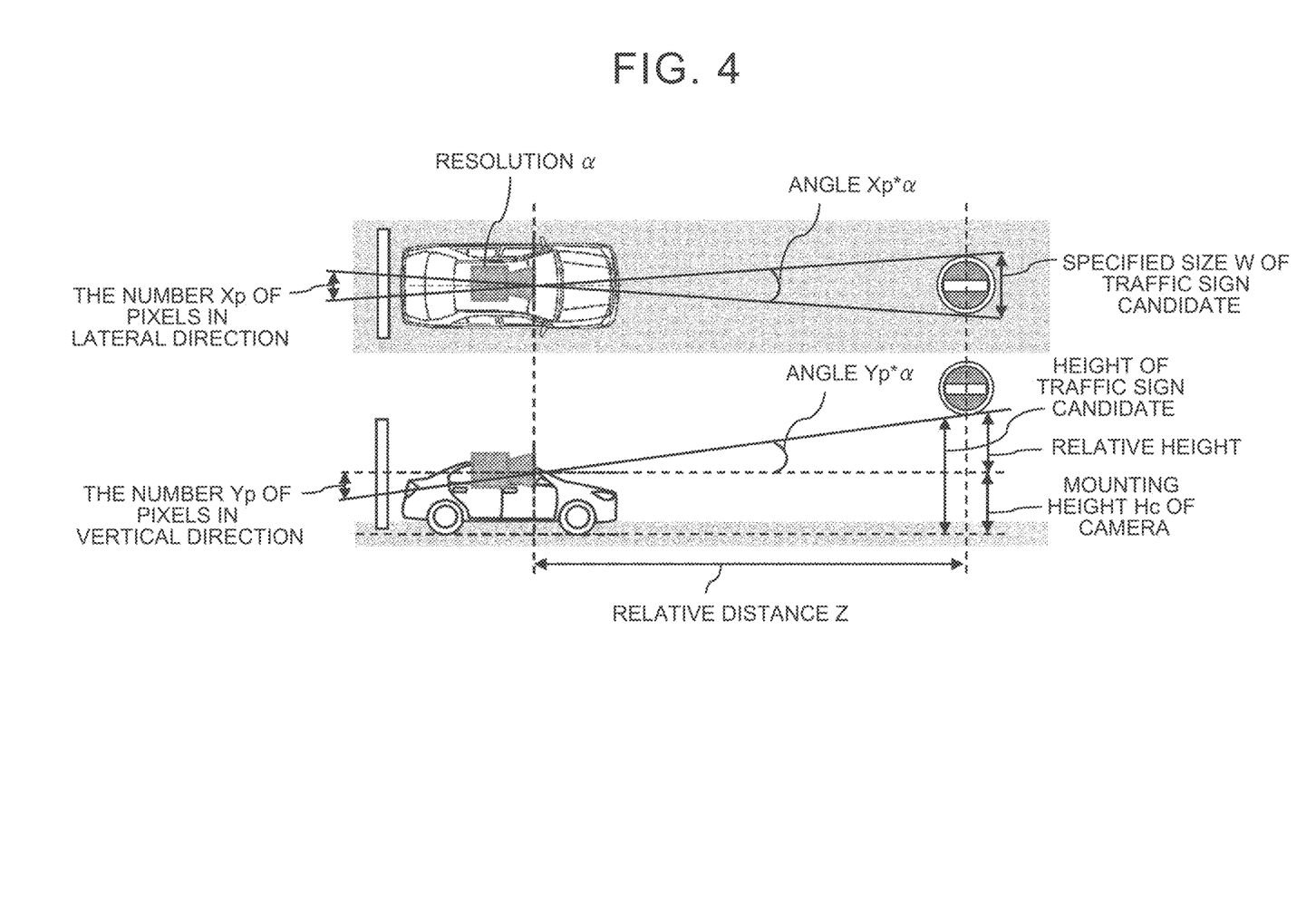
FIG. 4 is a view illustrating an exemplary process of a relative position estimation portion of the traffic sign recognition processing portion.

An exemplary method of estimating the relative position of the traffic sign candidate is illustrated in FIG. 4. When the resolution of the camera, included in the camera specification information 140, is taken as α, the number of pixels in the lateral direction, constituting an image of the traffic sign candidate, is taken as Xp, and the specified size of the traffic sign candidate, included in the traffic-sign-candidate specified size information 150, is taken as W, the relative distance of the traffic sign candidate to the movable body is expressed by the following expression (1).

Expression 1

$$\frac{W/2}{\tan\left(\frac{Xp*\alpha}{2}\right)} \quad (1)$$

When the relative distance of the traffic sign candidate to the movable body, expressed by the above expression (1), is taken as Z, the resolution of the camera is taken as a, and the number of pixels in the vertical direction, constituting the image of the traffic sign candidate, is taken as Yp, information on the relative height of the traffic sign candidate to the movable body is expressed by the following expression (2).

Expression 2

$$Z*\tan(Yp*\alpha) \quad (2)$$

When the mounting height of the camera is taken as Hc, information on the height of the traffic sign candidate is expressed by the expression (3).

Expression 3

$$Hc+Z*\tan(Yp*\alpha) \quad (3)$$

When the relative distance of the traffic sign candidate to the movable body as illustrated above is estimated, the traffic-sign-candidate specified size information 150 is used. That is, the relative distance is estimated on the premise that the magnitude of the traffic sign candidate is grasped in advance. In a case where the traffic-sign-candidate specified size information 150 is not used, a plurality of cameras may be provided in the movable body. The relative distance of the traffic sign candidate to the movable body may be estimated based on the principle of triangulation from images of the traffic sign candidate that are detected by the cameras.

The set region specifying portion 330 specifies a set region indicative of a region of a set of pieces of three-dimensional point group data satisfying a condition, based on the relative position of the traffic sign candidate, estimated by the relative position estimation portion 320, and the three-dimensional point group information 130. Details of the process of the set region specifying portion 330 will be described later.

The image region size specifying portion 340 specifies the size of an image region of an object including the traffic sign candidate, the image region corresponding to the set region, based on the set region estimated by the set region specifying portion 330. Here, the coordinates indicated by three-dimensional point group data included in the set region are expressed by the width, the height, and the distance relative to the mounting position of the three-dimensional measurement sensor. In the meantime, the coordinates indicated by a pixel included in the image region are expressed by the position of a pixel in the X-direction and a pixel in the Y-direction at the time when an image of the object is captured by an image sensor element, instead of being expressed by the width and the height relative to the mounting position of the camera. An expression manner of the coordinates indicated by the three-dimensional point group data is different from that of the camera image. On that account, it is necessary to associate the coordinates indicated by the three-dimensional point group data with the coordinates indicated by the camera image. The coordinates are associated with each other, for example, by use of an edge part (an end of a building, or the like) indicative of the feature of a target object. More specifically, in the three-dimensional point group data, the presence or absence of data can be found based on an edge part as a border, and therefore, the coordinates of the edge part can be grasped. In the meantime, in the camera image, an edge part can be detected by image processing. Accordingly, the coordinates indicative of the position of a pixel in the X-direction and in the Y-direction, constituted by an image of the edge part can be grasped. Hereby, the specified coordinates can be associated with each other, thereby making it possible to specify the size of the image region of the object including the traffic sign candidate, the image region corresponding to the set region. Note that, in a case where an object having a similar shape is present near a target object, it is assumed that respective coordinates of the objects different from each other might be associated with each other. Meanwhile, in a case where the coordinates are correctly associated with each other, it can be said that the association of the coordinates is performed just once as long as there is no change in the arrangement of the camera and the three-dimensional measurement sensor provided in the movable body. Accordingly, the association of the coordinates may be performed as part of calibration to be performed after the camera and the three-dimensional measurement sensor are provided on the movable body.

Figure 5:
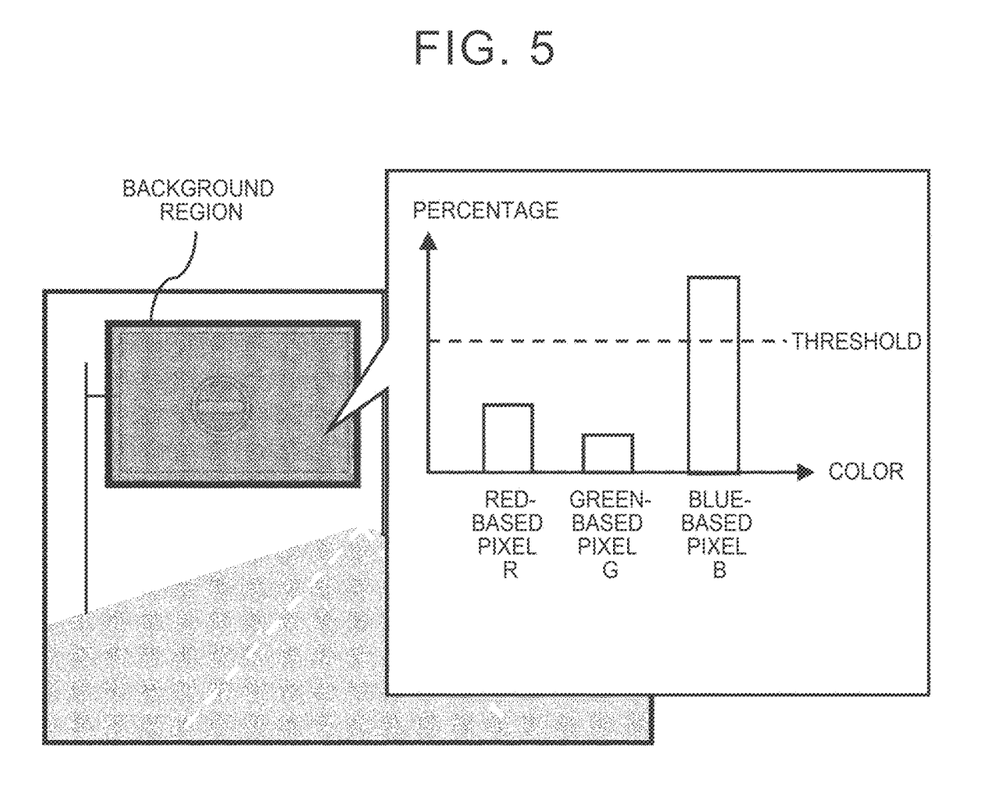
FIG. 5 is a view illustrating an exemplary process of a color component percentage determination portion of the traffic sign recognition processing portion.

The color component percentage determination portion 350 performs a threshold determination on what percent of color components constituting the image of the object a predetermined color component constituting the guide sign accounts for, based on the size of the image region of the object, specified by the image region size specifying portion 340, and color components constituting the image region of the object. More specifically, the image region is constituted by a plurality of pixels. A color component constituted by a unit pixel is indicated by a pixel value of a red-based pixel R, a pixel value of a green-based pixel G, and a pixel value of a blue-based pixel B. That is, color components constituted by the pixels of the image region are indicated by an integrated value obtained by integrating pixel values of the red-based pixels R among the pixels, an integrated value obtained by integrating pixel values of the green-based pixels G among the pixels, and an integrated value obtained by integrating pixel values of the blue-based pixels B among the pixels. The color components constituting the guide sign include a lot of green, a lot of blue, or a lot of both colors. Accordingly, the percentage of the integrated value obtained by integrating the pixel values of the green-based pixels G and the integrated value obtained by integrating pixel values of the blue-based pixels B as predetermined color components constituting the guide sign, among the color components constituting the image of the object, is calculated. Then, the threshold determination is performed to determine whether or not the percentage of at least either one of the integrated value obtained by integrating the pixel values of the green-based pixels G and the integrated value obtained by integrating the pixel values of the blue-based pixels B is equal to or more than a threshold. A concrete example of the threshold determination is exhibited in FIG. 5. Note that, as the color components, instead of an RGB color space, an HSV (Hue, Saturation, Value) color space obtained by converting the RGB color space into the HSV color space may be used.

As a result of the color component percentage determination portion 350, in a case where it is determined that the percentage of either of the integrated value obtained by integrating the pixel values of the green-based pixels G and the integrated value obtained by integrating the pixel values of the blue-based pixels B as the predetermined color components constituting the guide sign is equal to or more than the threshold, the traffic sign candidate recognition portion 360 recognizes the object including the traffic sign candidate to be the guide sign. In a case where the color component percentage determination portion 350 determines that the percentage is not equal to or more than the threshold, the traffic sign candidate recognition portion 360 recognizes the object including the traffic sign candidate not to be the guide sign.

The process result output portion 400 performs a process of outputting, to a processing portion or the like different from the traffic sign recognition processing portion 300, a recognition result of the traffic sign recognition processing portion 300 on whether or not the object including the traffic sign candidate is the guide sign.

Figure 6:
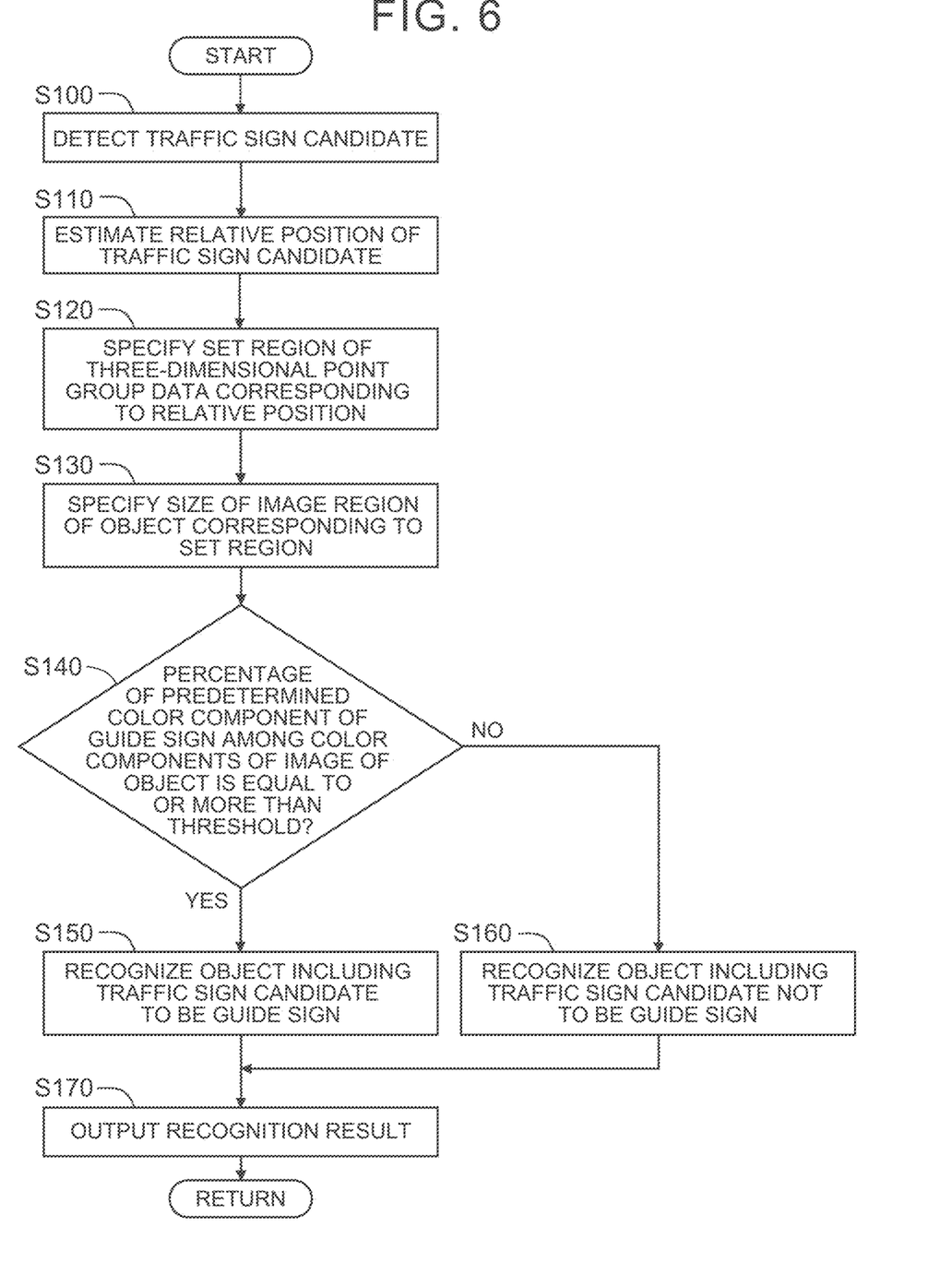
FIG. 6 is a flowchart illustrating an exemplary process of the traffic sign recognition processing portion.

FIG. 6 is a flowchart illustrating an exemplary process of the traffic sign recognition processing portion 300 of the traffic sign recognition device 10 according to the present embodiment.

In step S100, the traffic sign recognition processing portion 300 detects a traffic sign candidate based on the camera image information 120 input into the traffic sign recognition processing portion 300. After that, the process proceeds to step S110.

In step S110, the traffic sign recognition processing portion 300 estimates the relative position of the traffic sign candidate. After that, the process proceeds to step S120.

In step S120, the traffic sign recognition processing portion 300 specifies a set region indicative of the region of a set of pieces of three-dimensional point group data corresponding to the relative position of the traffic sign candidate. After that, the process proceeds to step S130.

In step S130, the traffic sign recognition processing portion 300 specifies the size of the image region of an object that corresponds to the set region. After that, the process proceeds to step S140.

In step S140, the traffic sign recognition processing portion 300 determines whether or not the percentage of a predetermined color component constituting the guide sign among color components constituting the image of the object is equal to or more than a threshold, based on the image region of the object.

In a case where the traffic sign recognition processing portion 300 determines that the percentage of the predetermined color component constituting the guide sign is equal to or more than the threshold (step S140: Yes), the process proceeds to step S150. In other cases (step S140: No), the process proceeds to step S160.

In step S150, the traffic sign recognition processing portion 300 recognizes the object including the traffic sign candidate to be the guide sign.

In step S160, the traffic sign recognition processing portion 300 recognizes the object including the traffic sign candidate not to be the guide sign.

In step S170, the traffic sign recognition processing portion 300 outputs the recognition result.

Figure 7:
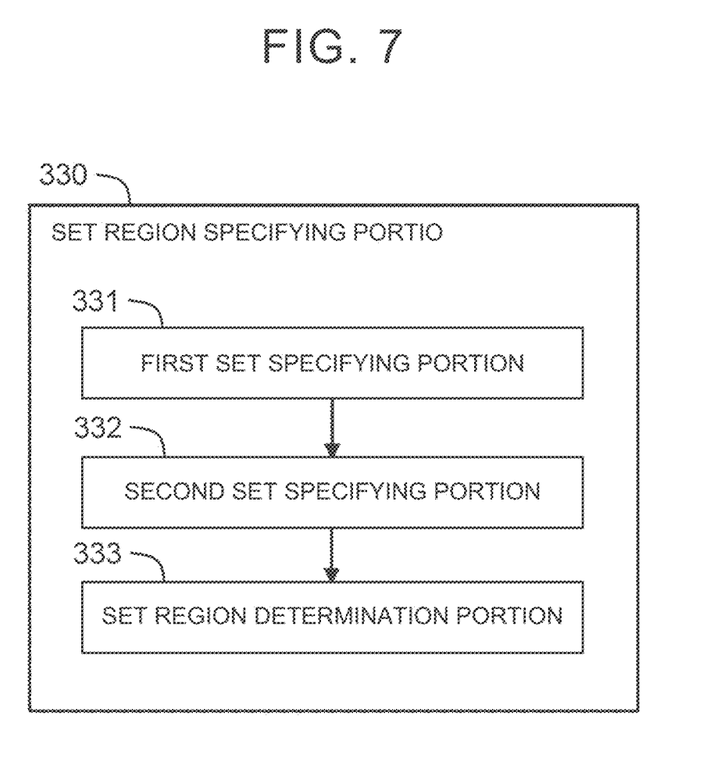
FIG. 7 is a block diagram illustrating an exemplary function of a set region specifying portion of the traffic sign recognition processing portion.

FIG. 7 is a block diagram illustrating an exemplary function of the set region specifying portion 330 of the traffic sign recognition processing portion 300 according to the present embodiment. The above description says that the set region specifying portion 330 specifies a set region indicative of the region of a set of pieces of three-dimensional point group data that satisfies a condition, based on the relative position of the traffic sign candidate, estimated by the relative position estimation portion 320, and the three-dimensional point group information 130. Herein, details of the process of the set region specifying portion 330 will be described. The set region specifying portion 330 includes a first set specifying portion 331, a second set specifying portion 332, and a set region determination portion 333. The following describes details of each processing portion.

Figure 8A:
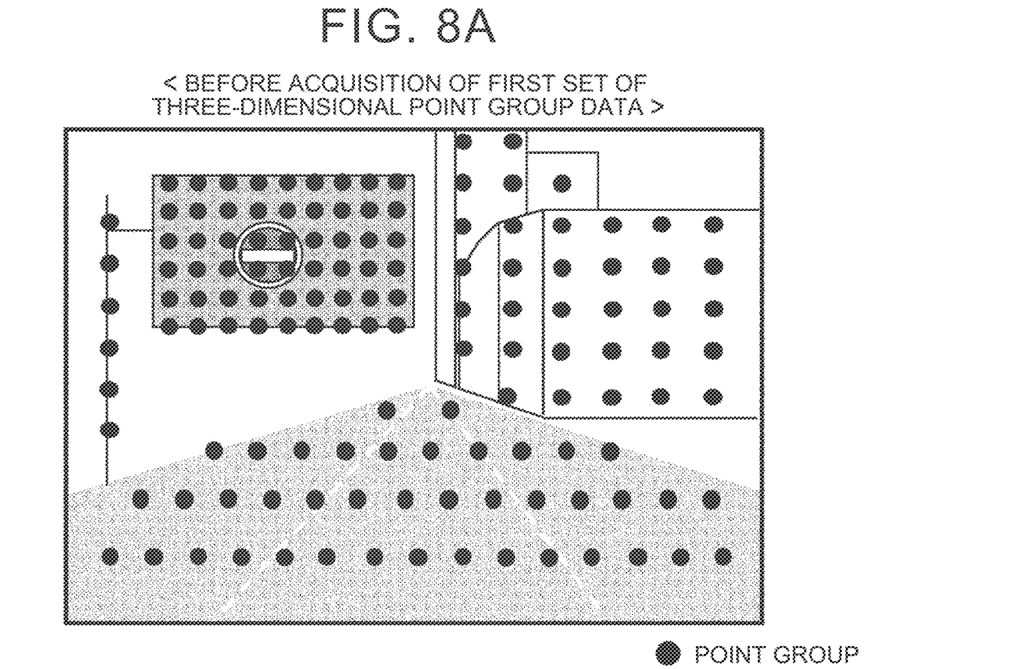
FIG. 8A is a view illustrating an example before the process of a first set specifying portion of the set region specifying portion is performed.
Figure 8B:
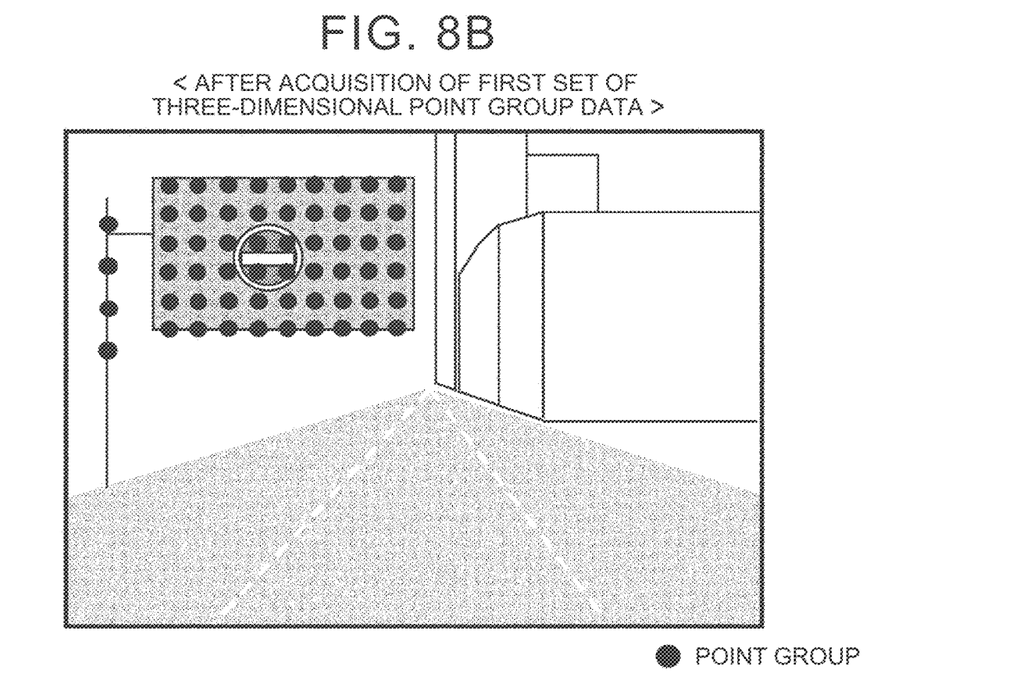
FIG. 8B is a view illustrating an exemplary process result of the first set specifying portion of the set region specifying portion.

The first set specifying portion 331 performs a process of specifying a set (hereinafter referred to as a first set) of pieces of three-dimensional point group data having a relative position equal to the relative position of the traffic sign candidate to the movable body, from among the data of the three-dimensional point group information 130. The relative position of the traffic sign candidate to the movable body is estimated by the relative position estimation portion 320. More specifically, a set of pieces of three-dimensional point group data satisfying a condition is specified as a first set. The condition is that the difference between a relative distance included in the relative position estimated by the relative position estimation portion 320 and a distance included in the pieces of three-dimensional point group data is within a first range, and the difference between a height included in the relative position and a height included in the pieces of three-dimensional point group data is within a second range. The first and second ranges are set in advance as ranges that the pieces of three-dimensional point group data are recognized to be present at the same position as the relative position in consideration of a measurement error based on the camera image and a measurement error based on the pieces of three-dimensional point group data, for example. Exemplary results before and after the acquisition of the first set are illustrated in FIGS. 8A, 8B.

The second set specifying portion 332 performs a process of specifying a set (hereinafter referred to as a second set) satisfying a predetermined condition from among the first set specified by the first set specifying portion 331. The predetermined condition includes a condition that the distance between the pieces of three-dimensional point group data is less than a predetermined distance and a point group density is equal to or more than a predetermined density. The point group density is indicative of how closely the pieces of three-dimensional point group data gather.

Figure 9:
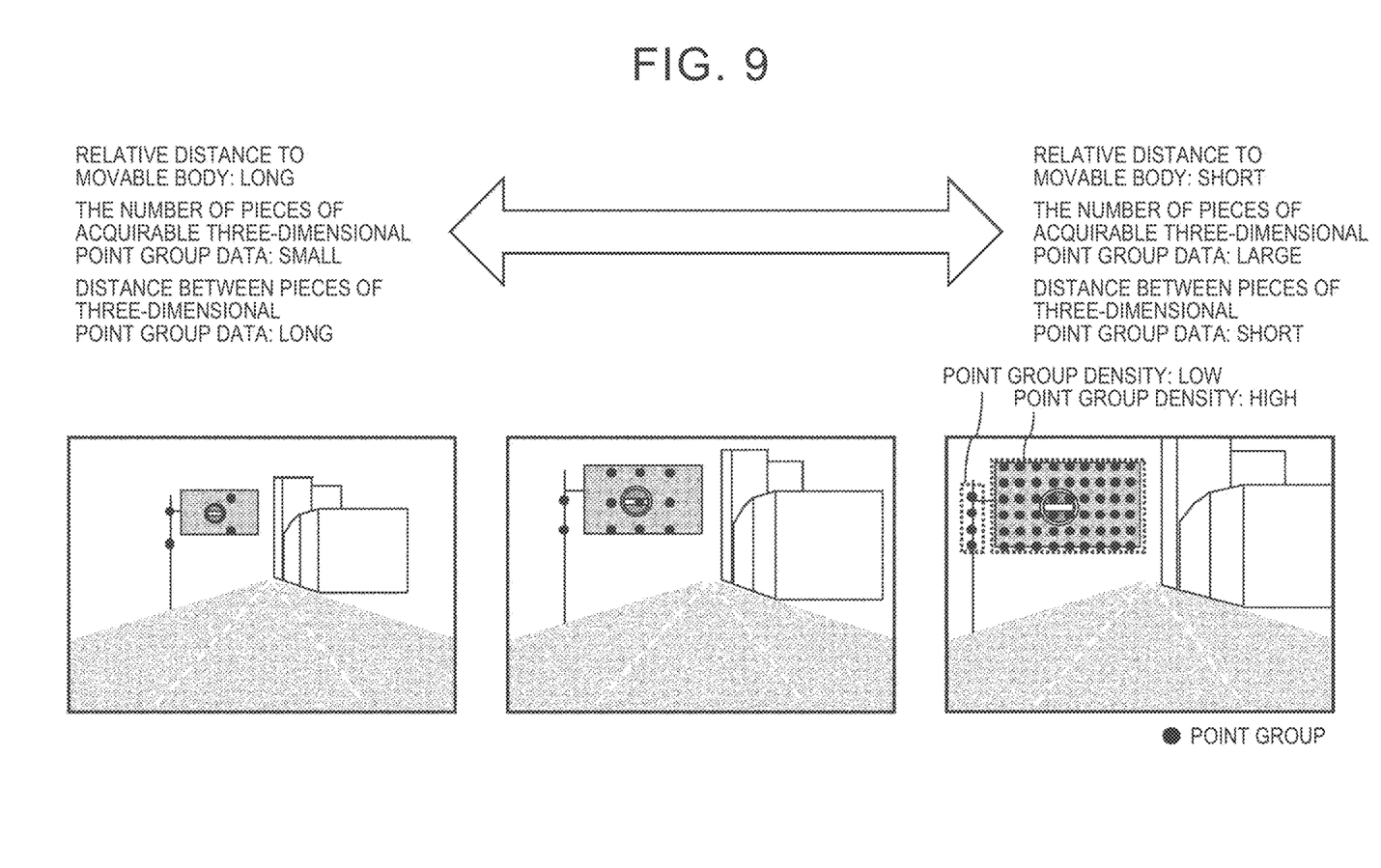
FIG. 9 is a view illustrating an exemplary process of a second set specifying portion of the set region specifying portion.

Here, the relationship, between the distance between pieces of three-dimensional point group data and the point group density of pieces of three-dimensional point group data, is illustrated in FIG. 9. FIG. 9 illustrates an example in consideration of three-dimensional point group data that can be acquired in accordance with the relative distance of the traffic sign candidate to the movable body. More specifically, as the relative distance is longer, the number of pieces of three-dimensional point group data that can be acquired decreases. As the relative distance is shorter, the number of pieces of three-dimensional point group data that can be acquired increases. Further, in a case where the number of pieces of three-dimensional point group data that can be acquired is small, the distance between the pieces of three-dimensional point group data is long. In a case where the number of pieces of three-dimensional point group data that can be acquired is large, the distance between the pieces of three-dimensional point group data is short. Based on this, in a case where the relative distance is long, it is assumed that a sufficient number of pieces of three-dimensional point group data cannot be secured to recognize the region of the object including the traffic sign candidate. Because of this, the accuracy of specifying a set region decreases. In the meantime, in a case where the relative distance is short, the number of pieces of three-dimensional point group data to be acquired increases, and therefore, a sufficient number of pieces of three-dimensional point group data can be secured to recognize the region of the object including the traffic sign candidate. That is, the accuracy of specifying a set region increases. As can be understood from this, the abovementioned predetermined condition includes a condition that the distance between pieces of three-dimensional point group data is less than a predetermined distance.

Note that, even in a case where the second set is specified based on the predetermined condition that the distance between pieces of three-dimensional point group data is less than the predetermined distance, it is assumed that pieces of unnecessary three-dimensional point group data are present at the same position as the relative distance. For example, as illustrated in FIG. 9, there is such a case that pieces of three-dimensional point group data is present in a support post near the guide sign. When pieces of unnecessary three-dimensional point group data present in the support post near the guide sign are specified as a set region, the accuracy of specifying a set region decreases. As a result, such a possibility is conceivable that, even when the object including the traffic sign candidate is actually a guide sign, the object is wrongly recognized not to be a guide sign. Accordingly, the abovementioned predetermined condition includes a condition that the point group density is equal to or more than the predetermined density. The point group density is indicative of how closely pieces of three-dimensional point group data gather.

Figure 10A:
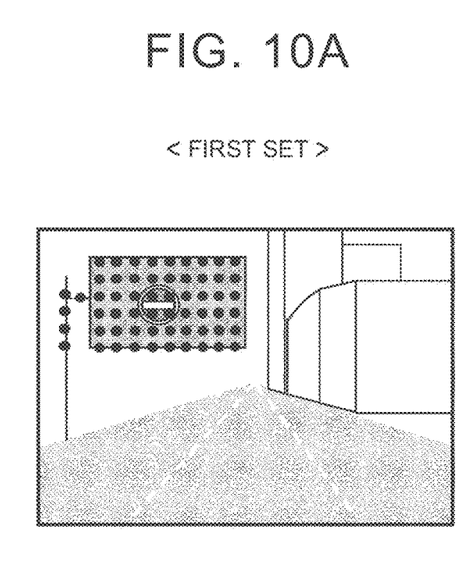
FIG. 10A is a view illustrating an exemplary process result of the first set specifying portion of the set region specifying portion.
Figure 10B:
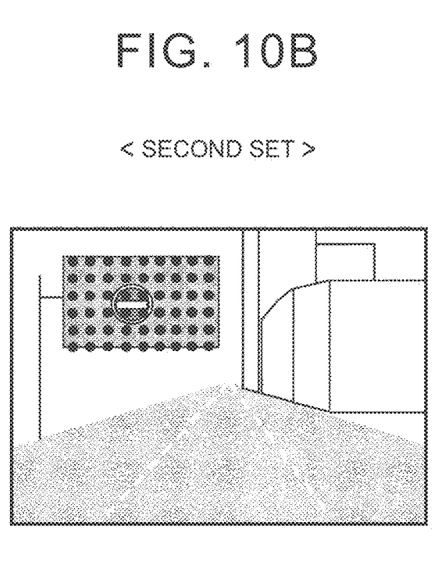
FIG. 10B is a view illustrating an exemplary process result of the second set specifying portion of the set region specifying portion.
Figure 10C:
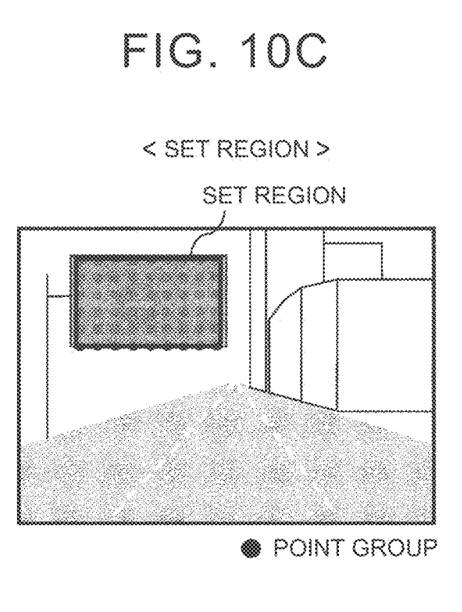
FIG. 10C is a view illustrating an exemplary process result of a set region determination portion of the set region specifying portion.

The set region determination portion 333 performs a process of determining a set region based on the second set specified by the second set specifying portion 332. More specifically, in terms of a lateral width and a vertical width calculated from the second set, in a case where at least the lateral width is equal to or more than a predetermined magnitude, the set region determination portion 333 determines that the region of the second set is a set region. Since the size of the image region of the object including the traffic sign candidate is larger than the size of the image of the traffic sign candidate, the predetermined magnitude as a determination reference based on which the specification of a set region is performed is set to a value larger than the size of the image of the traffic sign candidate. As a calculation method of calculating the lateral width and the vertical width of the second set, in a case where the three-dimensional coordinates of three-dimensional point group data included in the second set are considered in terms of two-dimensional coordinates of an X-coordinate and a Y-coordinate, for example, when the bottom left coordinates in the two-dimensional coordinates are taken as an origin, the distance from normal coordinates indicative of coordinates based on three-dimensional point group data nearest to the origin to first coordinates (coordinates in which the coordinate in the lateral direction (the X-direction) is maximum and the coordinate in the vertical direction (the Y-direction) is smallest) may be estimated to be the lateral width. Further, the distance from the normal coordinates to second coordinates (coordinates in which the coordinate in the lateral direction (the X-direction) is minimum and the coordinate in the vertical direction (the Y-direction) is largest) may be estimated to be the vertical width. An exemplary process result obtained in a case where the set region is determined is exhibited like FIG. 10C. FIG. 10A is an example in a case where the first set is specified. FIG. 10B is an example in a case where the second set is specified.

Figure 11:
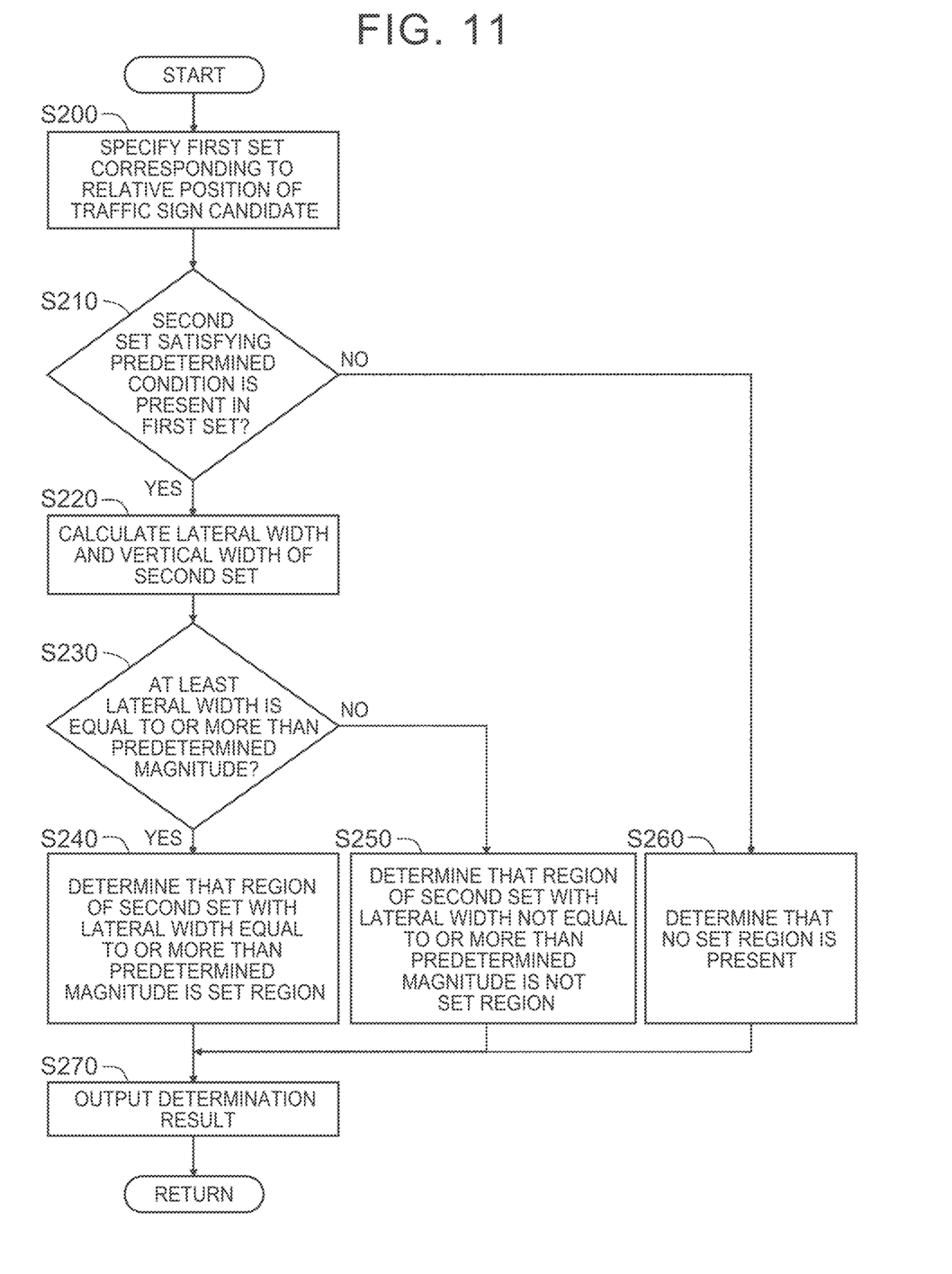
FIG. 11 is a flowchart illustrating an exemplary process of the set region specifying portion.

FIG. 11 is a flowchart illustrating an exemplary process of the set region specifying portion 330 of the traffic sign recognition processing portion 300 according to the present embodiment.

In step S200, the set region specifying portion 330 (the first set specifying portion 331) specifies a first set of pieces of three-dimensional point group data having a relative position equal to the relative position of the traffic sign candidate to the movable body. After that, the process proceeds to step S210.

In step S210, the set region specifying portion 330 (the second set specifying portion 332) determines whether or not there is a second set satisfying the predetermined condition among the first set.

In a case where the set region specifying portion 330 determines that there is a second set satisfying the predetermined condition (step S210: Yes), the process proceeds to step S220. In other cases (step S210: No), the process proceeds to step S260.

In step S220, the set region specifying portion 330 calculates the lateral width and the vertical width of the second set. After that, the process proceeds to step S230.

In step S230, in terms of the lateral width and the vertical width calculated in step S220, the set region specifying portion 330 determines whether or not at least the lateral width is equal to or more than the predetermined magnitude.

In a case where the set region specifying portion 330 determines that the at least the lateral width is equal to or more than the predetermined magnitude (step S230: Yes), the process proceeds to step S240. In other cases (step S230: No), the process proceeds to step S250.

In step S240, the set region specifying portion 330 determines that the region of the second set in which the at least the lateral width is equal to or more than the predetermined magnitude is a set region.

In step S250, the set region specifying portion 330 determines that the region of the second set in which the at least the lateral width is not equal to or more than the predetermined magnitude is not a set region.

In step S260, the set region specifying portion 330 determines that there is no set region.

In step S270, the set region specifying portion 330 outputs the determination result. The movable body in the present disclosure may be a four-wheeled vehicle. The movable body in the present disclosure may be an autonomous driving vehicle.

What is claimed is:

1. A traffic sign recognition device, comprising:
a storage device configured to store a camera image captured from a movable body and pieces of three-dimensional point group data; and
a processor configured to:
in a case where the camera image includes an image of a traffic sign candidate, estimate a relative position of the traffic sign candidate to the movable body based on the camera image;
specify a set of pieces of three-dimensional point group data including a relative position to the movable body among the pieces of three-dimensional point group data, the relative position of the specified set of pieces of three-dimensional point group data being equal to the relative position of the traffic sign candidate;
specify, in the camera image, an image region of an object including the traffic sign candidate, the image region of the object corresponding to a set region indicative of a region where the set is specified;
calculate, based on a size of the image region of the object and color components constituting the image of the object, a percentage of a predetermined color component constituting a guide sign among the color components constituting the image of the object; and
in a case where the percentage of the predetermined color component is equal to or more than a threshold, recognize the object including the traffic sign candidate to be the guide sign, wherein:
the storage device is configured to store,
information on a resolution of a camera,
information on specifications of the camera, including information on a mounting height of the camera, and
information on a specified size of the traffic sign candidate; the relative position includes
a relative distance of the traffic sign candidate to the movable body, and
a height of the traffic sign candidate, the height of the traffic sign candidate being obtained by adding the mounting height of the camera to a relative height of the traffic sign candidate to the movable body;
information on the camera image includes information on a plurality of camera images acquired by a plurality of cameras; and
the processor is configured to,
estimate the relative distance by performing calculation by use of the resolution of the camera, the number of pixels constituting the image of the traffic sign candidate in a lateral direction, and the specified size, and
estimate the relative height by performing calculation by use of the relative distance, the resolution of the camera, and the number of pixels constituting the image of the traffic sign candidate in a vertical direction.

2. The traffic sign recognition device according to claim 1, wherein
a lateral width and a vertical width of the set region is calculated based on a set satisfying a predetermined condition in the specified set, and
at least the lateral width is equal to or more than a predetermined magnitude.

3. The traffic sign recognition device according to claim 1, wherein:
the color components constituting the image of the object are indicated by
an integrated value obtained by integrating pixel values of red-based pixels,
an integrated value obtained by integrating pixel values of green-based pixels, and
an integrated value obtained by integrating pixel values of blue-based pixels; and
the predetermined color component is at least either one of the integrated value obtained by integrating the pixel values of the green-based pixels and the integrated value obtained by integrating the pixel values of the blue-based pixels.

4. The traffic sign recognition device according to claim 1, wherein
the traffic sign candidate includes at least a traffic regulation sign candidate.

5. A traffic sign recognition device, comprising:
a storage device configured to store a camera image captured from a movable body and pieces of three-dimensional point group data; and
a processor configured to:
in a case where the camera image includes an image of a traffic sign candidate, estimate a relative position of the traffic sign candidate to the movable body based on the camera image;
specify a set of pieces of three-dimensional point group data including a relative position to the movable body among the pieces of three-dimensional point group data, the relative position of the specified set of pieces of three-dimensional point group data being equal to the relative position of the traffic sign candidate;
specify, in the camera image, an image region of an object including the traffic sign candidate, the image region of the object corresponding to a set region indicative of a region where the set is specified;
calculate, based on a size of the image region of the object and color components constituting the image of the object, a percentage of a predetermined color component constituting a guide sign among the color components constituting the image of the object; and
in a case where the percentage of the predetermined color component is equal to or more than a threshold, recognize the object including the traffic sign candidate to be the guide sign, wherein:
the storage device is configured to store,
information on a resolution of a camera, and
information on specifications of the camera, including information on a mounting height of the camera;
the relative position includes
a relative distance of the traffic sign candidate to the movable body, and
a height of the traffic sign candidate, the height of the traffic sign candidate being obtained by adding the mounting height of the camera to a relative height of the traffic sign candidate to the movable body;
the camera image includes a plurality of camera images acquired by a plurality of cameras, the cameras being placed at different positions; and
the processor is configured to,
in a case where the camera images include the image of the traffic sign candidate, estimate the relative distance based on principle of triangulation from the image of the traffic sign candidate, and estimate the relative height by performing calculation by use of the relative distance, the resolution of the camera, and the number of pixels constituting the image of the traffic sign candidate in a vertical direction.

6. A traffic sign recognition device, comprising:

a storage device configured to store a camera image captured from a movable body and pieces of three-dimensional point group data; and a processor configured to:

in a case where the camera image includes an image of a traffic sign candidate, estimate a relative position of the traffic sign candidate to the movable body based on the camera image;

specify a set of pieces of three-dimensional point group data including a relative position to the movable body among the pieces of three-dimensional point group data, the relative position of the specified set of pieces of three-dimensional point group data being equal to the relative position of the traffic sign candidate;

specify, in the camera image, an image region of an object including the traffic sign candidate, the image region of the object corresponding to a set region indicative of a region where the set is specified;

calculate, based on a size of the image region of the object and color components constituting the image of the object, a percentage of a predetermined color component constituting a guide sign among the color components constituting the image of the object; and     in a case where the percentage of the predetermined color component is equal to or more than a threshold, recognize the object including the traffic sign candidate to be the guide sign, wherein a lateral width and a vertical width of the set region is calculated based on a set satisfying a predetermined condition in the specified set, at least the lateral width is equal to or more than a predetermined magnitude, and the predetermined condition includes a condition that a distance between pieces of three-dimensional point group data included in the set is less than a predetermined distance and a point group density is equal to or more than a predetermined density, the point group density being indicative of how closely the pieces of three-dimensional point group data included in the set gather.

\* \* \* \* \*